US012557130B2

(12) United States Patent
Li et al.

(10) Patent No.: US 12,557,130 B2
(45) Date of Patent: *Feb. 17, 2026

(54) METHOD AND DEVICE FOR ALLOCATING UPLINK CONTROL CHANNELS

(71) Applicant: SAMSUNG ELECTRONICS CO., LTD., Suwon-si (KR)

(72) Inventors: Yingyang Li, Beijing (CN); Yi Wang, Beijing (CN); Shichang Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,309

(22) Filed: May 30, 2024

(65) Prior Publication Data

US 2024/0323987 A1 Sep. 26, 2024

Related U.S. Application Data

(63) Continuation of application No. 18/175,258, filed on Feb. 27, 2023, now Pat. No. 12,063,672, which is a
(Continued)

(30) Foreign Application Priority Data

Jan. 3, 2017 (CN) .......................... 201710001422.4

(51) Int. Cl.
*H04W 72/53* (2023.01)
*H04L 1/1812* (2023.01)
(Continued)

(52) U.S. Cl.
CPC ........... *H04W 72/53* (2023.01); *H04L 1/1819* (2013.01); *H04L 1/1861* (2013.01);
(Continued)

(58) Field of Classification Search
CPC ........... H04W 72/0493; H04W 72/042; H04W 72/0413; H04L 1/1819; H04L 1/1861;
(Continued)

(56) References Cited

U.S. PATENT DOCUMENTS 8,958,383 B2 2/2015 Fu et al.
9,179,458 B2 11/2015 Park
(Continued)

FOREIGN PATENT DOCUMENTS

| AU | 2014200894 A1 | 3/2014 |
| FR | 2988247 A1 | 9/2013 |
| WO | 2012099368 A2 | 7/2012 |

OTHER PUBLICATIONS

Huawei, HiSilicon, "Handling collision between PUCCH and sPUCCH", 3GPP TSG RAN WG1 Meeting #87, Nov. 14-18, 2016, 4 pages, R1-1611164.
(Continued)

*Primary Examiner* — Ricky Q Ngo
*Assistant Examiner* — Kabir U Jahangir

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure provides a method for allocating Physical Uplink Control Channel (PUCCH) resources, including: a User Equipment (UE) detects a Physical Downlink Control Channel (PDCCH) scheduling a Physical Downlink Shared Channel (PDSCH) in a configured control resource set; the UE analyzes the detected PDCCH, correspondingly receives PDSCH, and determines PUCCH resources feeding back Hybrid Automatic Repeat request-ACK (HARQ-ACK) information; the UE transmits the HARQ-ACK information by using the determined PUCCH resources. By adopting the method in the present disclosure, a method for allocating
(Continued)

PUCCH resources is provided. An upper-limit resource utilization is improved. And a method for indicating PUCCH resources in Downlink Control Information (DCI) is put forward, thereby reducing bit overheads of DCI.

16 Claims, 5 Drawing Sheets

Related U.S. Application Data continuation of application No. 16/476,001, filed as application No. PCT/KR2018/000051 on Jan. 2, 2018, now Pat. No. 11,595,963.

(51) Int. Cl.
*H04L 1/1829* (2023.01)
*H04L 5/00* (2006.01)
*H04W 72/23* (2023.01)

(52) U.S. Cl.
CPC ........... *H04L 5/0055* (2013.01); *H04W 72/23* (2023.01); *H04L 5/0007* (2013.01)

(58) Field of Classification Search
CPC ... H04L 5/0055; H04L 5/0007; H04L 5/0053; H04L 1/1854; H04L 1/1864
See application file for complete search history.

(56) References Cited

U.S. PATENT DOCUMENTS

| | | |
|---|---|---|
| 9,325,476 B2 | 4/2016 | Li et al. |
| 10,637,635 B2 | 4/2020 | He et al. |
| 2012/0082130 A1 | 4/2012 | Xue et al. |
| 2012/0327916 A1 | 12/2012 | Ahn et al. |
| 2014/0044025 A1 | 2/2014 | Li et al. |
| 2014/0362746 A1 | 12/2014 | Yang et al. |
| 2015/0085719 A1 | 3/2015 | Yin et al. |
| 2015/0173065 A1 | 6/2015 | Fu et al. |
| 2015/0358111 A1 | 12/2015 | Marinier et al. |
| 2016/0249340 A1 | 8/2016 | Cheng et al. |
| 2017/0105198 A1 | 4/2017 | Fu et al. |
| 2017/0208568 A1 | 7/2017 | Nam et al. |
| 2018/0042015 A1 | 2/2018 | Yin et al. |
| 2018/0076935 A1* | 3/2018 | Seo ............................ H04L 1/00 |
| 2018/0206224 A1 | 7/2018 | Hwang et al. |
| 2019/0123861 A1* | 4/2019 | Liu ................... H04W 72/0446 |
| 2019/0150007 A1* | 5/2019 | Frenne ................. H04L 5/0055 370/252 |
| 2019/0239214 A1 | 8/2019 | Yang et al. |
| 2019/0260521 A1 | 8/2019 | Luo et al. |
| 2019/0280828 A1 | 9/2019 | Zhou et al. |
| 2019/0349942 A1* | 11/2019 | Li ......................... H04L 1/1861 |
| 2019/0372721 A1* | 12/2019 | Lee ....................... H04L 1/1864 |
| 2020/0022098 A1 | 1/2020 | Takeda et al. |

OTHER PUBLICATIONS

ZTE, ZTE Microelectronics, "HARQ timing and resource of PUCCH", 3GPP TSG-RAN WG1 Meeting #87, Nov. 14-18, 2016, 4 pages, R1-1611290.
International Search Report dated Apr. 5, 2018 in connection with International Patent Application No. PCT/KR2018/000051, 3 pages.
Written Opinion of the International Searching Authority dated Apr. 5, 2018 in connection with International Patent Application No. PCT/KR2018/000051, 6 pages.
Supplementary European Search Report in connection with European Application No. 18736080.5 dated Aug. 17, 2020, 9 pages.
Huawei, et al., "Discussion on timing relations and signaling of HARQ timing for NR," R1-1611218, 3GPP TSG RAN WG1 Meeting #87, Reno, USA, Nov. 14-18, 2016, 4 pages.
Huawei, et al., "Discussion on timing relations for NR," R1-1608839, 3GPP TSG RAN WG1 Meeting #86bis, Lisbon, Portugal, Oct. 10-14, 2016, 5 pages.
Huawei, et al., "Discussion on unlink control channel design in NR," R1-1608840, 3GPP TSG RAN WG1 Meeting #86bis, Lisbon, Portugal, Oct. 10-14, 2016, 3 pages.
China National Intellectual Property Administration, "The First Office Action," issued Nov. 2, 2022, in connection with Chinese Patent Application No. 201710001422.4, 9 pages.
Samsung, "HARQ-ACK Resource Indication in PUCCH for DL CA," 3GPP TSG RAN WG1 #62bis, R1-105359, Xian, China, Oct. 11-15, 2010, 4 pages.
Office Action issued Sep. 14, 2023, in connection with Chinse Patent Application No. 201710001422.4, 14 pages.

\* cited by examiner

PRIOR ART

METHOD AND DEVICE FOR ALLOCATING UPLINK CONTROL CHANNELS

CROSS-REFERENCE TO RELATED APPLICATIONS

This application is a continuation of application Ser. No. 18/175,258 filed on Feb. 27, 2023, which is a continuation of application Ser. No. 16/476,001 filed Jul. 3, 2019, now U.S. Pat. No. 11,595,963 issued Feb. 28, 2023, which is a 371 of International Application No. PCT/KR2018/000051 filed on Jan. 2, 2018, which claims priority to Chinese Patent Application No. 201710001422.4 filed on Jan. 3, 2017, the disclosures of which are herein incorporated by reference in their entirety.

BACKGROUND

1. Field

The present disclosure relates to wireless communication system technologies, and more particularly, to a method and a device for allocating Physical Uplink Control Channel (PUCCH) when transmitting downlink data based on Hybrid Automatic Repeat reQuest (HARQ).

2. Description of the Related Art

In a wireless communication system, a downlink transmission refers to transmitting a signal from a Base Station (BS) to a User Equipment (UE). A downlink signal includes a data signal, a control signal and a reference signal (pilot). Here, a BS transmits downlink data in a Physical Downlink Shared Channel (PDSCH), or transmits Downlink Control Information (DCI) in a downlink control channel. An uplink transmission refers to transmitting a signal from a user device to a BS. An uplink signal also includes a data signal, a control signal and a reference signal. Here, a UE transmits uplink data in a Physical Uplink Shared Channel (PUSCH), or transmits Uplink Control Information (UCI) in a Physical Uplink Control Channel (PUCCH). The BS may dynamically schedule a PDSCH transmission and a PUSCH transmission of a UE, by using a Physical Downlink Control Channel (PDCCH).

In a third Generation Partnership Project (3GPP) Long Term Evolution (LTE) system, a downlink transmission technology is Orthogonal Frequency Division Multiple Access (OFDMA), and an uplink transmission technology is Single-Carrier Frequency-Division Multiple Access (SCFDMA). As shown in FIG. 1, length of each wireless frame is 10 ms, which is divided into 10 subframes equally. A downlink Transmission Time Interval (TTI) is defined for one subframe. Each downlink subframe includes two time slots. For a normal Cyclic Prefix (CP) length, each time slot includes 7 OFDM symbols. A granularity of resource allocation is a Physical Resource Block (PRB). A PRB includes 12 consecutive sub-carriers at frequency, which correspond to one time slot at time. A Resource Element (RE) is the minimum unit of time-frequency resources, which is a subcarrier for frequency, but is an OFDM symbol for time.

In a LTE system, DCIs destined for different UEs or DCIs of different functions are encoded and transmitted independently. When performing a physical resource mapping on PDCCH, a Control Channel Element (CCE) is taken as a unit. That is, modulation symbols of one PDCCH may be mapped to L CCEs. L=1, 2, 4, or 8. L may also be referred to as an aggregation level of PDCCH. In a LTE system, a UE is configured to detect PDCCH at multiple possible positions, which are referred to as search space of the UE. A BS transmits PDCCH to the UE from a position of the search space, which is configured to be detected by the UE. The UE obtains control information from the BS, by performing a blind-detection in the search space configured by the BS. In a LTE system, PUCCH format 1a/1b may be implicitly allocated based on CCE. For example, nCCE is indexed corresponding to CCE. An index of a corresponding resource under PUCCH format 1a/1b is $$n_{PUCCH}^{(1)} = n_{CCE} + N_{PUCCH}^{(1)}.$$

$N_{PUCCH}^{(1)}$ is an offset value, which is semi-statically configured by a high layer. For a PDCCH, a mapped resource under the PUCCH format 1a/1b may be obtained, based on the minimum CCE index of the PDCCH. In addition, in order to support a simultaneous feedback of a greater Hybrid Automatic Repeat request-ACK (HARQ-ACK) payload, resources of N PUCCH formats 3, 4, 5 may be configured by a high layer. And one of foregoing N resources may be dynamically indicated, by using ACK/NACK Resource Indicator information (ARI) in the PDCCH.

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

The 3GPP standard organizations are standardizing a New Radio access network technology (NR). The NR is still a system based on OFDM. In a NR system, modulation symbols of one PDCCH may still be mapped to one or more CCEs. Correspondingly, PUCCH resources may be implicitly obtained based on the CCE's index. Alternatively, N PUCCH resources may be configured by a high layer. And one of foregoing N resources may be dynamically indicated in the PDCCH. Depending on a frame structure of the NR, when PUCCH resources are effectively allocated, how to optimize PDCCH information is an urgent problem to be solved.

The present disclosure provides a method and a device for allocating Physical Uplink Control Channel (PUCCH) resources, and provides a mechanism, which improves an upper-limit resource utilization and reduces bit overhead of downlink DCI.

To achieve foregoing objectives, the present disclosure adopts the following technical solutions.

A method for allocating PUCCH resources, including:

detecting, by a User Equipment (UE), a Physical Downlink Control Channel (PDCCH) scheduling a Physical Downlink Shared Channel (PDSCH) in a configured control resource set;

analyzing, by the UE, the detected PDCCH, correspondingly receiving the PDSCH, and determining PUCCH resources feeding back Hybrid Automatic Repeat request-ACK (HARQ-ACK) information; and, transmitting, by the UE, the HARQ-ACK information by using the determined PUCCH resources.

Preferably, determining the PUCCH resources feeding back the HARQ-ACK information includes:

on the basis of a HARQ-ACK feedback delay indicated by the PDCCH, for one PUCCH, constituting a binding window by a set of downlink Time Units (Tus) and/or Mini Time Unit (MTUs), which are located by all the possible PDSCHs feeding back the HARQ-ACK information in the PUCCH;

allocating the PUCCH resources feeding back the HARQ-ACK information for a Control Channel Element (CCE) of each downlink TU and/or MTU within the binding window, or, allocating the PUCCH resources feeding back the HARQ-ACK information for CCEs of some downlink Tus and/or MTUs within the binding window.

Preferably, determining the PUCCH resources feeding back the HARQ-ACK information includes:

for a PDCCH, a HARQ-ACK feedback delay of the PDCCH is $k_i \leq SC$, allocating a short PUCCH (sPUCCH) for feeding back the HARQ-ACK information; otherwise, allocating a long PUCCH (lPUCCH) for feeding back the HARQ-ACK information, wherein C is a parameter for controlling a type of the allocated PUCCH; or, for a PDCCH, the HARQ-ACK feedback delay of the PDCCH is $k_i \leq C_1$, only allocating a sPUCCH for feeding back the HARQ-ACK;

for a PDCCH, the HARQ-ACK feedback delay of the PDCCH is $C_1 < k_i \leq C_2$, supporting to dynamically distinguish a sPUCCH and a lPUCCH for feeding back the HARQ-ACK; otherwise, only allocating a lPUCCH for feeding back the HARQ-ACK, wherein $C_1$ and $C_2$ are parameters for controlling a type of the allocated PUCCH, $C_1$ is less than or equal to $C_2$.

Preferably, the method further includes:

corresponding to one or more minimum values of $k_i$, allocating implicit sPUCCH resources feeding back the HARQ-ACK information for the PDCCH, and for another $k_i$, indicating lPUCCH resources for feeding back the HARQ-ACK information by ACK/NACK Resource Indicator (ARI), wherein the ARI is indicated by HARQ-ACK resources.

Preferably, determining the PUCCH resources feeding back the HARQ-ACK information includes:

on the basis of a HARQ-ACK feedback delay, determining the allocated implicit PUCCH resources for feeding back the HARQ-ACK information, or adopting an ARI to indicate the PUCCH resources for feeding back the HARQ-ACK information;

for a PDCCH, the HARQ-ACK feedback delay of the PDCCH is $k_i \leq C$, allocating the implicit PUCCH resources for feeding back the HARQ-ACK information; otherwise, allocating the PUCCH resources for feeding back the HARQ-ACK information based on the ARI; or, on the basis of 1-bit indication information of the PDCCH, determining the currently allocated implicit PUCCH resources for feeding back the HARQ-ACK information, or allocating the PUCCH resources for feeding back the HARQ-ACK information based on the ARI; or, for a PDCCH, a Downlink Assignment Index (DAI) of the PDCCH is 1, allocating the implicit PUCCH resources for feeding back the HARQ-ACK information; otherwise, indicating the PUCCH resources for feeding back the HARQ-ACK information by using the ARI; or, for the first PDSCH scheduled within the binding window, the DAI of the PDCCH of the first PDSCH is 1, allocating the implicit PUCCH resources for feeding back the HARQ-ACK information; otherwise, indicating the PUCCH resources for feeding back the HARQ-ACK information by using the ARI; or, in a case, where $k_i \leq C$ and DAI=1, allocating the implicit PUCCH resources feeding back the HARQ-ACK information for the PDCCH; otherwise, allocating the PUCCH resources feeding back the HARQ-ACK information based on the ARI.

Preferably, the method further includes:

performing a joint encoding on a HARQ-ACK feedback delay and an ARI, wherein an information field of the joint encoding is configured to indicate a time and position of the allocated PUCCH resources, and resources occupied within a time and position.

Preferably, determining the PUCCH resources feeding back the HARQ-ACK information includes:

when simultaneously allocating sPUCCH resources and lPUCCH resources within one uplink TU, transmitting corresponding HARQ-ACK information by using an Orthogonal Frequency Division Multiplexing (OFDM) symbol according to the sPUCCH, wherein lPUCCH and sPUCCH are conflicting with each other on the OFDM symbol, and, transmitting the corresponding HARQ-ACK information by using the remaining OFDM symbols, according to the lPUCCH; or, transmitting, by the UE, the corresponding HARQ-ACK information in one PUCCH therein, and discarding the remaining HARQ-ACK information.

Preferably, determining the PUCCH resources feeding back the HARQ-ACK information includes:

when simultaneously allocating multiple lPUCCH resources within one uplink TU, transmitting, by the UE, the corresponding HARQ-ACK information in one lPUCCH, and discarding the remaining HARQ-ACK information; or, feeding back, by the UE, all the HARQ-ACK information needing to be fed back in one lPUCCH.

Preferably, determining the PUCCH resources feeding back the HARQ-ACK information includes:

when simultaneously allocating multiple sPUCCH resources within one uplink TU, transmitting, by the UE, the corresponding HARQ-ACK information in one sPUCCH, and discarding the remaining HARQ-ACK information; or, feeding back, by the UE, all the HARQ-ACK information needing to be fed back in one sPUCCH.

A device for allocating PUCCH resources, including: a PDCCH detecting and analyzing module, a PDSCH receiving module, a PUCCH resource determining module and a transceiver module, wherein the PDCCH detecting and analyzing module is configured to detect a PDCCH scheduling a PDSCH in a configured control resource set, and analyze the detected PDCCH;

the PDSCH receiving module is configured to receive the PDSCH based on the detected PDCCH;

the PUCCH resource determining module is configured to determine PUCCH resources for feeding back Hybrid Automatic Repeat request-ACK (HARQ-ACK) information; and, the transceiver module is configured to receive a downlink signal from a Base Station (BS), and transmit the HARQ-ACK information by using the determined PUCCH resources.

By adopting the method of the present disclosure, a method for allocating PUCCH resources is provided, so as to improve utilization of upper-limit resources. And a method for indicating PUCCH resources in the DCI is also provided, which reduces bit overheads of DCI.

DETAILED DESCRIPTION

Figure 1:
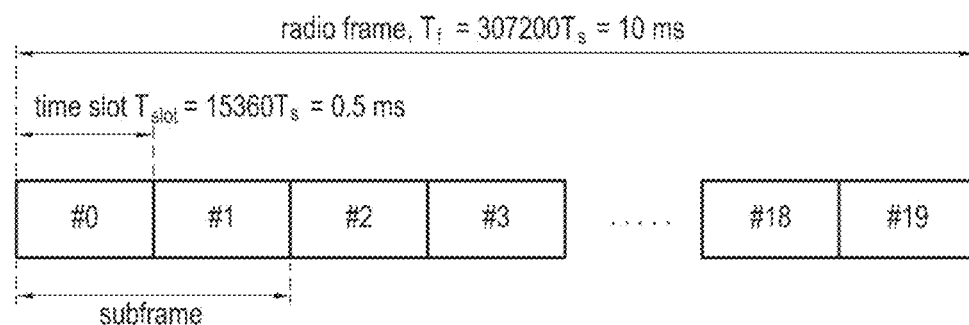
FIG. 1 is a frame structure of a LTE Frequency-division duplexing (FDD) system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal receiving apparatus may be, for example, a user equipment (UE), and a signal transmitting apparatus may be, for example, a base station.

In various embodiments of the present disclosure, it will be noted that the term UE may be interchangeable with the terms mobile station (MS), wireless terminal, mobile device, and/or the like.

In various embodiments of the present disclosure, it will be noted that the term base station may be interchangeable with the terms node B, evolved Node B (eNB), access point (AP), and/or the like.

An embodiment of the present disclosure proposes an apparatus and method for performing a channel decoding operation in a communication system.

An embodiment of the present disclosure proposes an apparatus and method for performing a channel decoding operation based on resource element (RE) grouping in a communication system.

An embodiment of the present disclosure proposes an apparatus and method for performing a channel decoding operation using a plurality of soft decision decoding metric generating schemes in a communication system.

An embodiment of the present disclosure proposes an apparatus and method for performing a channel decoding operation by considering interference in a communication system.

An embodiment of the present disclosure proposes an apparatus and method for performing a channel decoding operation by considering interference regardless of whether location information for an interference reference signal is provided in a communication system.

An embodiment of the present disclosure proposes an apparatus and method for performing a channel decoding operation by considering interference based on RE grouping in a communication system.

An embodiment of the present disclosure proposes an apparatus and method for performing a channel decoding operation by considering a Gaussian characteristic of an interference signal and a non-Gaussian characteristic of the interference signal in a communication system.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an evolved packet system (EPS), and a mobile internet protocol (Mobile IP) system, and/or the like.

In various embodiments of the present disclosure, it will be noted that the term 'PDCCH' may be interchangeable with the terms downlink control channel, first downlink channel, and/or the like. And, it will be noted that the term 'PDSCH' may be interchangeable with the terms downlink data channel, second downlink channel, and/or the like. And, it will be noted that the term 'PUCCH' may be interchangeable with the terms uplink control channel, uplink channel, and/or the like.

To make objectives, technical solutions and advantages of the present disclosure more clear, detailed descriptions of the present disclosure are further provided in the following, accompanying with attached figures and embodiments.

Figure 2:
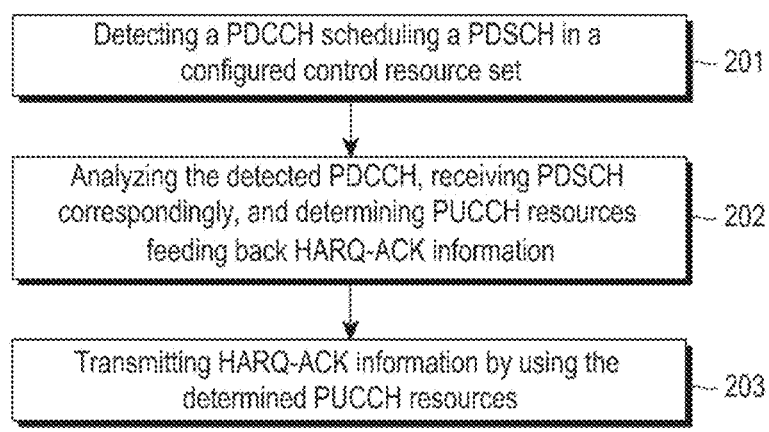
FIG. 2 is a flowchart, in accordance with an embodiment of the present disclosure.

FIG. 2 is a flowchart, in accordance with an embodiment of the present disclosure.

In block 201, a User Equipment (UE) detects a Physical Downlink Control Channel (PDCCH) scheduling a Physical Downlink Shared Channel (PDSCH) in a configured control resource set.

Time resources may be divided, according to a certain Time Unit (TU). The TU may be a subframe, or a slot. One TU may be divided into multiple Mini Time Units (MTUs), e.g., mini-slot. Each MTU includes one or more Orthogonal Frequency Division Multiplexing (OFDM) symbols. Within a downlink TU, a Base Station (BS) may configure 'Q' control resource sets for a User Equipment (UE), and Q is greater than or equal to 1. For a control resource set, the control resource set corresponds to one or more OFDM symbols at time, and corresponds to one or more Physical Resource Blocks (PRBs) at frequency. One PDCCH maps to one control resource set. The UE detects PDCCH in a control resource set, which is configured by a BS.

In block 202, the UE analyzes the detected PDCCH, receives PDSCH correspondingly, and determines PUCCH resources feeding back Hybrid Automatic Repeat Request-Acknowledgement (HARQ-ACK) information.

For a HARQ-based downlink data transmission, after receiving data transmitted by the BS, the UE needs to correspondingly feed back HARQ-ACK information. Within Downlink Control Information (DCI) carried by PDCCH scheduling downlink data transmission, information for indicating delay of HARQ-ACK feedback may be included. On the basis of the delay of HARQ-ACK feedback indicated by the DCI, HARQ-ACK information of multiple PDSCHs may be fed back in one PUCCH. Assume that PDCCH and PDSCH scheduled by the PDCCH are located within the same TU or MTU, the feedback delay refers to a delay from the same TU or MTU to PUCCH. Assume that a cross-TU or a cross-MTU scheduling is adopted. That is, a delay from PDCCH to PDSCH scheduled by the PDCCH is 'd1', and a delay from PDSCH to PUCCH is 'd2'. The HARQ-ACK feedback delay may refer to the d2, and may also refer to a sum of the d1 and the d2. Thus, on the basis of the feedback delay of the DCI, a set of downlink TU and/or MTU constitutes a bundling window (or a binding window), in which the downlink TU and/or MTU is located by PDSCH possibly feeding back HARQ-ACK information in one PUCCH.

The UE may feed back the HARQ-ACK information, based on two kinds of PUCCH types. The first type is 'long' PUCCH (IPUCCH). The IPUCCH may be mapped to an OFDM symbol of one uplink TU to be transmitted, so as to bear more bits, and/or provide a greater coverage. The second type is 'short' PUCCH (sPUCCH). The sPUCCH occupies less OFDM symbols, which may be mapped to one MTU, or even occupies one OFDM symbol. Thus, within one TU, different sPUCCHs are transmitted by different MTUs and/or OFDM symbols, based on a time-division method. Number of HARQ-ACK bits capable of being carried by sPUCCH is less than, or equal to v bits, e.g., v=2.

For IPUCCH, denote that PDSCH is located within a downlink TU 'n', and a feedback delay 'k' is indicated by the DCI, subsequently, the UE feeds back that HARQ-ACK resource corresponding to such PDSCH in located within an uplink TU n+k. For sPUCCH, in addition to indicating an uplink TU located by sPUCCH, it may be further necessary to indicate which MTU or which OFDM symbol of the uplink TU is located by sPUCCH. Alternatively, the DCI may jointly indicate the uplink TU located by sPUCCH, and further indicate which MTU or which OFDM symbol of the uplink TU is located by sPUCCH. For example, for sPUCCH, a step length of feedback delay 'k' in the DCI may be one MTU, or one OFDM symbol. Assume that only a part of MTUs, or a part of OFDM symbols within one TU may bear sPUCCH, it may count the number of MTUs or OFDM symbols of each TU, which can be used for sPUCCH, and the counted number of MTUs or OFDM symbols of each TU may be dynamically indicated by feedback delay 'k'.

For one PDCCH, allocated PUCCH resources may be implicitly obtained, based on CCE occupied by the PDCCH. Such PUCCH resources generally bear 'u' HARQ-ACK bits at most, e.g., u=2, similar to PUCCH format 1a/1b in the LTE. In addition, on the basis of the HARQ-ACK feedback delay indicated by DCI, HARQ-ACK information of multiple PDSCHs may be fed back within one uplink TU. At this time, another PUCCH resource is needed, which supports to simultaneously feed back a greater HARQ-ACK payload, e.g., similar to PUCCH formats 3, 4 or 5 in the LTE. For PUCCH resources supporting a greater HARQ-ACK payload, N PUCCH resources may be configured by a higher layer. One of foregoing N resources may be dynamically indicated by ARI in the PDCCH.

In block 203, the UE transmits the HARQ-ACK information using the determined PUCCH resources.

A method for allocating PUCCH resources in the present disclosure will be described in the following, accompanying with embodiments.

The First Embodiment

In downlink control information (DCI) for scheduling a downlink data transmission, information for indicating a HARQ-ACK feedback delay may be included. Within a bundling window (or a binding window), time sequence of downlink TU and/or MTU and feedback delay indicated by transmitted DCI are reversed. For example, denote that an index of a downlink TU located by PDSCH is $t_i$n-$k_i$, $k_i \in K$, i==0, 1, . . . , M-1, in which the PDSCH feeds back HARQ-ACK information in an uplink TU 'n'. The 'K' is a set of feedback delay. The 'M' denotes the number of elements in the set K. Subsequently, when index '$t_i$' of each downlink TU is arranged in an ascending order, corresponding HARQ-ACK feedback delay '$k_i$' is in a descending order. Value range of $k_i$ depends on a value range of feedback delay '$k_i$' indicated by the DCI. For example, assume that feedback delay adopts 4 bits, which indicate that the feedback delay is 0~15 TUs, the value range of $k_i$ is 0~15.

Within one downlink TU and/or MTU of foregoing bundling window, a BS may configure 'Q' control resource sets for a UE, in which Q is greater than or equal to 1. For foregoing bundling window, it is necessary to allocate PUCCH resources for CCE of each downlink TU and/or MTU within foregoing bundling window. Alternatively, it is necessary to allocate PUCCH resources for CCE of some downlink TUs and/or MTUs within foregoing bundling window. The method about respectively mapping corresponding PUCCH resources for each CCE is referred to as an implicit PUCCH resource allocation. Actually, for foregoing implicit PUCCH resource allocation, the BS may also improve flexibility of resource allocation, by using information of DCI, e.g., HARQ-ACK Resource Offset (ARO). Thus, for a downlink TU and/or MTU needing to map PUCCH resources implicitly, in order to support the implicit PUCCH resource allocation, denote that an index of one CCE of the $q^{th}$ control resource set is $n_{ECCE,q}$, PUCCH resources mapped by the CCE are.

$$n^{(1)}_{PUCCH} = f(n_{ECCE,q}) + \Delta_{ARO} + N^{(1)}_{PUCCH,q}$$

Here, $f(n_{ECCE,q})$ is a function of $n_{ECCE,q}$. A specific function form is not limited by the present disclosure. $N_{PUCCH,q}^{(1)}$ is an initial offset of PUCCH resources mapped by the $q^{th}$ control resource set, which is configured by high-layer signaling. $\Delta_{ARO}$ is an offset value dynamically indicated by the DCI, thereby improving the flexibility for allocating implicit PUCCH resources by the BS.

When not considering impact of ARO, for a downlink TU and/or MTU needing to implicitly map PUCCH resources within a bundling window, PUCCH resources may be implicitly allocated for each CCE by using a one-to-one mapping. Denote that the number of downlink TUs and/or MTUs needing to implicitly map PUCCH resources within the bundling window is P, it is considered that the allocated implicit PUCCH resources are divided into P blocks. Besides, the CCE of the $p^{th}$ downlink TU and/or MTU is mapped to the $p^{th}$ PUCCH Resource Block (RB) correspondingly, p=0,1, . . . P-1. Denote that the feedback delay of the $p^{th}$ downlink TU and/or MTU is $k_{f(p)}$. When all the downlink TUs and/or MTUs within the bundling window need to implicitly map PUCCH resources, f(p)=p, P=M assume that the $R^{th}$ downlink TU and/or MTU in the bundling window need to map the implicit PUCCH resources initially, f(p)=p+R, P=M-R. For example, for the $q^{th}$ control resource set, denote that the total number of CCE within TU n-$k_{f(p)}$ is $N_{ECCE,q,n-k_{f(p)}}$, subsequently, within the bundling window, an initial offset of PUCCH resources mapped by the $m^{th}$ TU needing to implicitly map PUCCH resources is $$\sum_{p=0}^{m-1} N_{ECCE,q,n-k_{f(p)}} + + N^{(1)}_{PUCCH,q}.$$

When considering the impact of ARO, on the basis of foregoing resource allocation of one-to-one mapping, flexibility of resource allocation may be further improved, and overheads of needed PUCCH resources are reduced. For example, after setting ARO, CCE of the $m^{th}$ downlink TU and/or MTU needing to map implicit PUCCH resources within the bundling window may be mapped to the $m'^{th}$ PUCCH RB, m'<m, thereby supporting to compress overheads of PUCCH resources. M' may be 0, that is, m' may represent the first PUCCH RB. Alternatively, m' may also be another value. Each value of ARO may be used for compressing the overheads of PUCCH resources, that is, m'<m. A different ARO value may correspond to a same, or a different value of m'. Alternatively, some ARO values may still be used for allocating the $m^{th}$ PUCCH RB. The remaining ARO values are used for compressing the overheads of PUCCH resources. A different ARO value may correspond to a same, or a different value of m'. For example, similar to a method for allocating a channel under PUCCH format 1a/1b, which is mapped by CCE of EPDCCH in the LTE system, for the 0 (or $0^{th}$) TU or MTU implicitly mapping PUCCH resources within the bundling window, four optional values of ARO are {0, −2, −1, 2}. For the $m^{th}$ TU and/or MTU needing to map implicit PUCCH resources within the bundling window, m is greater than 0, HARQ-ACK channel offsets indicated by four codewords of ARO are respectively $$\Delta_{ARO} = \left\{0, -\sum_{p=0}^{m-1} N_{ECCE,q,n-k_{f(p)}} - 2, -\sum_{p=m-\lceil m/3 \rceil}^{m-1} N_{ECCE,q,n-k_{f(p)}} - 1, 2\right\}.$$

The Second Embodiment

On the basis of foregoing discussions, PUCCH resources feeding back HARQ-ACK by a UE may be IPUCCH and/or sPUCCH. The IPUCCH may bear more payloads, which may bear HARQ-ACK of PDSCH of multiple downlink TUs and/or MTUs within a bundling window. Generally speaking, HARQ-ACK information of PDSCH with less stringent delay requirements is fed back by 1PUCCH. Correspondingly, sPUCCH supports smaller payloads, which generally supports a data transmission with more stringent delay requirements. On the basis of foregoing analysis, 1PUCCH and sPUCCH may be differentiated by information indicating HARQ-ACK feedback delay, which is carried by DCI for scheduling downlink data transmission.

Figure 3:
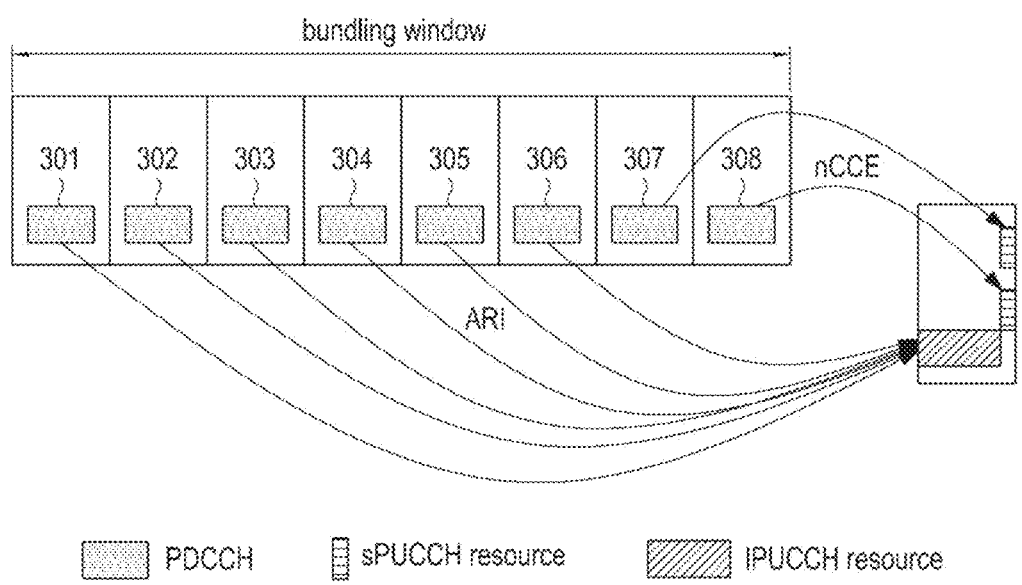
FIG. 3 is a schematic diagram illustrating how to determine a PUCCH type based on a feedback delay, in accordance with an embodiment of the present disclosure.

A first method is as follows. For a HARQ-ACK feedback delay $k_i \in K$, in a case, where $k_i$ is smaller, e.g., $k_i \leq C$, sPUCCH is allocated corresponding to one piece of DCI; otherwise, IPUCCH is allocated corresponding to one piece of DCI. 'C' is a predefined constant, or a parameter configured by high-layer signaling. For example, sPUCCH is allocated for DCI of a downlink TU of the minimum feedback delay, c may be 0. That is, PDSCH and sPUCCH feeding back such PDSCH may be located within the same TU (self-contain). At most v HARQ-ACK bits are fed back by sPUCCH, e.g., v=2. However, for another $k_i$ value, the DCI may indicate an IPUCCH format, which is capable of feeding back a greater payload. For example, C may be 3. In a case where $k_i$=0, 1, 2, 3, sPUCCH resources respectively exist, so as to feed back 4 HARQ-ACK bits at most based on a channel selection method. However, for another $k_i$ value, a BS may indicate an IPUCCH format, which is capable of feeding back a greater payload. As shown in FIG. 3, here assume that a bundling window obtained based on feedback delay includes 8 TUs 301-308, DCI of TUs 301-306 with greater feedback delay indicates IPUCCH. DCI of two TUs 307 and 308 with smaller feedback delay indicates sPUCCH.

In this method, sPUCCH resources and/or IPUCCH resources may be implicitly allocated based on CCE, or may be explicitly indicated based on ARI. For $k_i \leq C$, sPUCCH resources corresponding to $k_i$ of minimum feedback delay are implicitly allocated. For example, C may be 0. That is, PDSCH and sPUCCH feeding back such PDSCH are located within the same TU. Alternatively, for $k_i \leq C$, when DAI included by DCI is 1, corresponding sPUCCH resources are allocated implicitly.

A second method is as follows. For $k_i \in K$, assume in a case, where feedback delay $k_i$ is relatively smaller, e.g., $k_i \leq C_1$, sPUCCH is allocated corresponding to one piece of DCI. For $C_1 < k_i \leq C_2$, corresponding to one piece of DCI, it is supported to dynamically differentiate sPUCCH and IPUCCH; otherwise, only IPUCCH is allocated corresponding to one piece of DCI. $C_1$ and/or $C_2$ are predefined constants, or parameters configured by high-layer signaling. $C_1$ is less than or equal to $C_2$. By adopting this method, it is possible to perform joint encoding on HARQ-ACK feedback delay in the DCI and allocated PUCCH type, so as to reduce overheads for indicating these two kinds of information. For example, a domain of joint encoding indicates the following information. When $k_i \leq C_1$, one codeword is needed for each feedback delay. When $C_1 k_i \leq C_2$, two codewords are needed for each feedback delay. In other cases, only one codeword is needed for each feedback delay. For example, only sPUCCH is allocated for DCI of a downlink TU of the minimum feedback delay. $C_1$ may be 0. That is, PDSCH and sPUCCH feeding back such PDSCH are located within the same TU. At most v HARQ-ACK bits are fed back by the sPUCCH. For example, v=2. For $0 < k_i \leq C_2$, it is supported to dynamically distinguish sPUCCH and IPUCCH in the DCI. For another $k_i$, corresponding to one piece of DCI, only IPUCCH is allocated.

In this method, sPUCCH resources and/or IPUCCH resources may be implicitly allocated based on CCE, or may be explicitly indicated based on ARI. For $k_i \leq C_1$, regarding $k_i$ of the minimum feedback delay, corresponding sPUCCH resources are implicitly allocated. For example, $C_1$ may be 0. That is, PDSCH and sPUCCH feeding back such PDSCH are located within the same TU. Alternatively, for $k_i \leq C_1$, only when DAI included by DCI is equal to 1, correspondingly sPUCCH resources are implicitly allocated.

By adopting foregoing first and second methods, corresponding to the supported minimum value of $k_i$, sPUCCH resources may be implicitly allocated. For another $k_i$, IPUCCH resources are indicated by ARI in the DCI. When receiving a downlink TU allocated with implicit sPUCCH resources, e.g., when receiving one PDSCH and DAI of the DCI is equal to 1, HARQ-ACK information is fed back by sPUCCH. In other cases, a greater payload may be fed back by IPUCCH indicated by ARI. Alternatively, when a UE only receives a downlink TU allocated with implicit sPUCCH resources, no matter whether a UE is able to determine a BS has already scheduled PDSCH of other downlink TUs, HARQ-ACK information is fed back by sPUCCH. In other cases, a greater payload may be fed back by IPUCCH indicated by ARI.

By adopting foregoing first and second methods, implicit sPUCCH resources may be allocated for corresponding supported C' minimum values of $k_i$. For another $k_i$, IPUCCH resources are indicated by ARI. C' is a predetermined constant, or a parameter configured by higher-layer signaling. When a UE only receives a downlink TU allocated with implicit sPUCCH resources, and cannot determine there is still other DCI indicating sPUCCH based on DAI, the UE feeds back HARQ-ACK information by sPUCCH; in other cases, the UE feeds back a greater payload via IPUCCH indicated by ARI. Alternatively, when a UE only receives a downlink TU allocated with implicit sPUCCH resources, no matter whether the UE is capable of determining a BS has scheduled PDSCH of other downlink TUs, the UE feeds back HARQ-ACK information via sPUCCH; in other cases, the UE feeds back a greater payload via IPUCCH indicated by ARI.

A third method is as follows. A UE is semi-statically configured by high-layer signaling to adopt sPUCCH or IPUCCH.

When sPUCCH is configured, sPUCCH resources may be implicitly allocated based on CCE, or, sPUCCH resources may be explicitly indicated based on ARI. For example, for $k_i \in K_S$, $K_S$ is a set of downlink TUs and/or MTUs feeding back HARQ-ACK information based on sPUCCH, in which the downlink TUs and/or MTUs are within a bundling window. For $k_1 \leq C_S$, $C_S$ is a predefined constant, or a parameter configured by high-layer signaling, e.g., $C_S$ may be 0, corresponding sPUCCH resources may be implicitly allocated based on CCE. For another $k_i$, sPUCCH may be explicitly indicated based on ARI. Alternatively, for the supported minimum value of $k_i$, when a UE only receives one PDSCH and DAI indicated by DCI is equal to 1, corresponding sPUCCH resources may be implicitly allocated based on CCE, which are configured to feed back no more than v HARQ-ACK bits, e.g., v=2; otherwise, sPUCCH may be explicitly indicated based on ARI, and may feed back a greater payload.

When IPUCCH is configured, IPUCCH resources may be implicitly allocated based on CCE, or may be explicitly indicated based on ARI. For example, for $k_i \in K_L$, $K_L$ is a set of downlink TUs and/or MTUs feeding back HARQ-ACK information based on IPUCCH, in which the downlink TUs and/or MTUs are within a bundling window. For the supported minimum value of $k_i$, corresponding IPUCCH resources may be implicitly allocated based on CCE, which are configured to feed back no more than w HARQ-ACK bits, e.g., w=2. For another $k_i$, IPUCCH may be explicitly indicated based on ARI, and may feed back a greater payload. Alternatively, for the supported minimum value of $k_i$, when a UE only receives one PDSCH and DAI indicated by DCI is equal to 1, corresponding IPUCCH resources may be implicitly allocated based on CCE, and are configured to feed back no more than w HARQ-ACK bits, e.g., w=2; otherwise, IPUCCH may be explicitly indicated based on ARI, and may feed back a greater payload.

The Third Embodiment

For a HARQ-based downlink data transmission, after receiving data from a BS, a UE needs to feed back HARQ-ACK information correspondingly. From one aspect, for some or all the downlink TUs and/or MTUs within a bundling window, it is necessary to implicitly allocate PUCCH resources based on CCE. For example, by adopting the method in the first embodiment, ARO may be used to provide flexibility of resource allocation and compress overheads. From another aspect, in order to support a greater HARQ-ACK payload, PUCCH resources capable of carrying more HARQ-ACK bits may be indicated based on ARI mechanism. That is, N PUCCH resources are configured by a high layer, and one of foregoing N resources may be dynamically indicated by ARI in the PDCCH.

Figure 4:
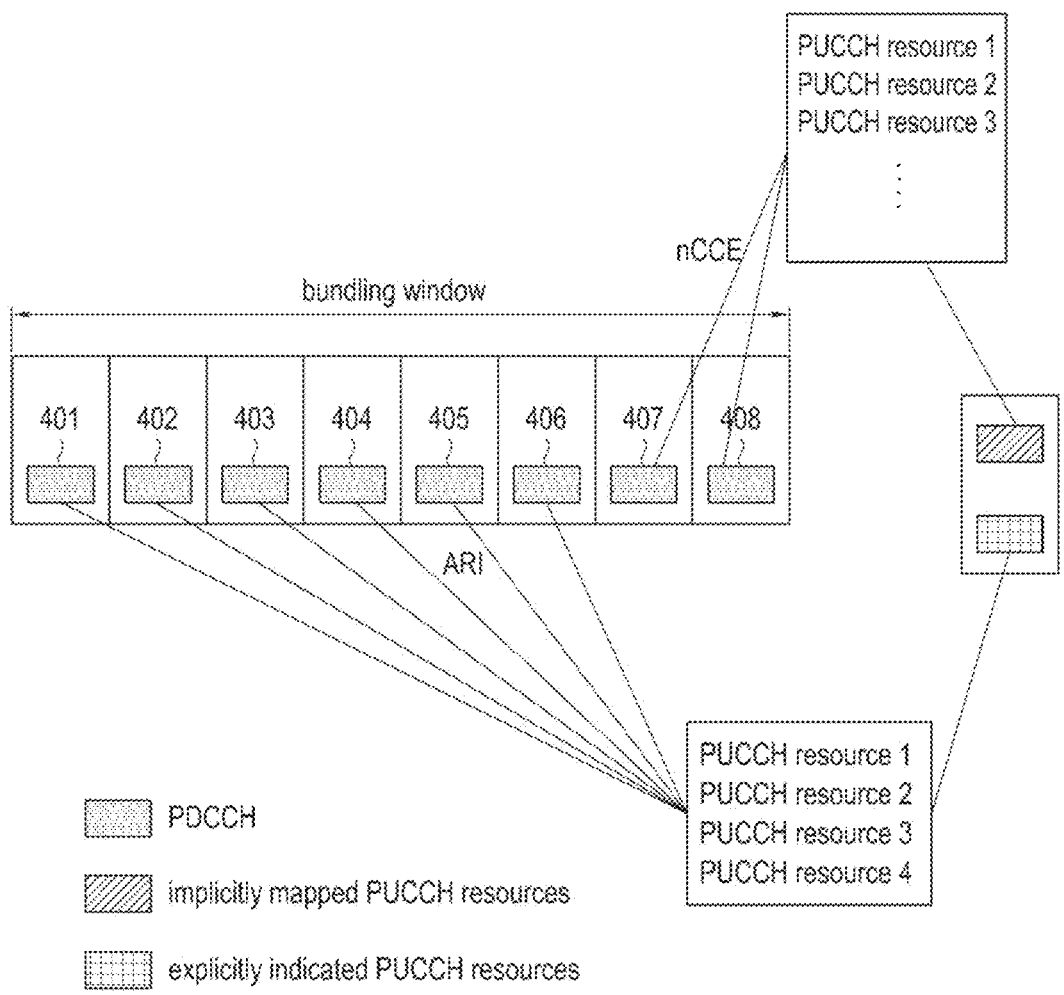
FIG. 4 is a schematic diagram illustrating how to allocate PUCCH resources based on a feedback delay, in accordance with an embodiment of the present disclosure.

In order to allocate PUCCH resources, it may be determined to allocate implicit PUCCH resources based on HARQ-ACK feedback delay, or indicate the PUCCH resources by ARI. For $k_i \in K$, in a case where $k_i$ is smaller, e.g., $k_i \leq C$, implicit PUCCH resources are allocated; otherwise, PUCCH resources are allocated based on ARI in DCI. C is a predefined constant, or a parameter configured by high-layer signaling. On the basis of the value of parameter C, one or more downlink TUs and/or MTUs of implicit PUCCH resources are allocated. As shown in FIG. 4, here assume that a bundling window includes 8 TUs 401~408, in which the bundling window is obtained based on feedback delay, for DCI of TUs 401~406 of greater feedback delay, PUCCH resources are explicitly indicated by ARI. For DCI of TUs 407~408 of smaller feedback delay, PUCCH resources are implicitly obtained by CCE. Alternatively, DCI may include indication information of 1 bit, and indicate currently allocated implicit PUCCH resources, or PUCCH resources are allocated based on ARI. Foregoing method for allocating PUCCH resources may be applicable to a case, where DCI does not include DAI, or DCI includes DAI.

In order to allocate PUCCH resources, assume that DCI includes DAI information, implicit PUCCH resources may be only allocated for DCI, DAI of which is 1; otherwise, PUCCH resources are indicated by ARI. Alternatively, assume that DCI includes DAI information, implicit PUCCH resources may be allocated for the first PDSCH scheduled within a bundling window, in which DAI of DCI of the first PDSCH is 1; otherwise, PUCCH resources are indicated by ARI. Alternatively, for $k_i \in K$, in a case, where $k_i$ is smaller and DAI=1, e.g., $k_i \leq C$, implicit PUCCH resources are allocated; otherwise, PUCCH resources are allocated based on ARI. C is a predefined constant, or a parameter configured by high-layer signaling. On the basis of the value of C, one or more downlink TUs and/or MTUs of implicit PUCCH resources may be allocated.

By adopting foregoing method, for one DCI, when implicit resources are allocated, ARO information of DCI is used for providing flexibility of resource allocation and compressing overheads; otherwise, ARI information of DCI is used for indicating PUCCH resources. Functions of foregoing ARO or ARI are mutually exclusive. Thus, the same information field of DCI may be reused, e.g., a 2-bit field indicates ARO or ARI in different cases. That is, when allocating implicit resources, such information field is taken as ARO; otherwise, such information field is taken as ARI. Name of such field is not limited by the present disclosure, which may still be referred to as ARO, ARI or another name.

The Fourth Embodiment

For a HARQ-based downlink data transmission, after receiving data from a BS, a UE needs to feed back HARQ-ACK information correspondingly. When PUCCH resources are indicated based on ARI mechanism, N PUCCH resources are configured by a high layer, and one of foregoing N resources is dynamically indicated by ARI in PDCCH. The PUCCH resource, which is indicated based on ARI mechanism, may be a PUCCH format capable of bearing at most u bits, e.g., u=2, or may be a PUCCH format capable of bearing a greater HARQ-ACK payload. In a LTE system, ARI indicates one of multiple PUCCH resources within one subframe. When supporting to indicate a feedback delay in the DCI, feedback delay information indicates a position of PUCCH resource feeding back HARQ-ACK information from the time dimension in addition to what indicated by ARI. For methods of respectively indicating feedback delay and ARI, effects thereof are respectively to transmit time and position of allocated PUCCH resources, and resources occupied within the time and position.

Since HARQ-ACK timing in the DCI indicates time and position of PUCCH resources at a given time, the application puts forward to perform a joint encoding on foregoing feedback delay and ARI, subsequently, a field of this joint encoding from one aspect indicates time and position of allocated PUCCH resources, from another aspect indicates resources occupied within one time and position. The field of joint encoding extends functions of ARI in the LTE. By adopting this joint method, control overheads may be reduced. By adopting this method, on the basis of some other parameters, possible value number of feedback delay needing to be indicated, and possible value number of ARI needing to be indicated may be adjusted. Meanwhile, bit number of the field of joint encoding is kept unchanged. For example, assume that bit number of the field of joint encoding is given, in some cases, it may indicate less possibility of feedback delay. However, it is allowed to distinguish more candidate PUCCH resources in one time and position. In some cases, it may indicate more possibility of feedback delay, while less candidate PUCCH resources in one time and position. For some feedback delays, e.g., DCI corresponding to a smaller feedback delay, implicit PUCCH resources are allocated, it is not necessary to indicate ARI for such feedback delay, so as to reduce overheads of foregoing field of joint encoding.

The Fifth Embodiment

In DCI scheduling a downlink data transmission, information for indicating HARQ-ACK feedback delay may be included. On the basis of the HARQ-ACK feedback delay indicated by the DCI, HARQ-ACK information of multiple PDSCHs may be fed back within one uplink TU. For example, a BS schedules one or more PDSCHs, and feeds back HARQ-ACK information by using the same PUCCH resource. Alternatively, within one uplink TU, X PUCCH resources are allocated simultaneously, and X is greater than or equal to 2. And the X PUCCH resources are respectively configured to feed back HARQ-ACK information of some scheduled PDSCHs. In such a case, a simple method is as follows. A UE respectively transmits HARQ-ACK information by using the X PUCCH resources simultaneously. Alternatively, only when time-frequency resources of multiple PUCCH resources allocated for a UE are not overlapped, the UE respectively transmits HARQ-ACK information on the X PUCCH resources simultaneously. In addition, due to a limitation of the maximum transmission power of a UE, or in order to reduce Peak to Average Power Ratio (PAPR) of an uplink signal, or time-frequency resources of multiple PUCCH resources allocated for the UE are overlapped, the UE may only transmit corresponding HARQ-ACK information in one PUCCH. The method of the present disclosure is described in detail in the following.

Within one uplink TU, a UE may simultaneously allocate one IPUCCH resource and one sPUCCH resource, and feed back different HARQ-ACK information. At this time, a first processing method is as follows. On the basis of sPUCCH, corresponding HARQ-ACK information is transmitted by using an OFDM symbol, on which IPUCCH and sPUCCH are conflicting with each other. On the basis of IPUCCH, corresponding HARQ-ACK information is transmitted by using other OFDM symbols. A second processing method is as follows. A UE may only transmit corresponding HARQ-ACK information via one PUCCH therein. That is, the UE discards the remaining PUCCH resources and HARQ-ACK information thereof, e.g., discards IPUCCH, since sPUCCH generally bears HARQ-ACK information of more strict delay requirements. Alternatively, from the aspect of a payload size of HARQ-ACK, only IPUCCH may be transmitted, such that the BS obtains more HARQ-ACK information, and performances of downlink transmission may be improved.

Within one uplink TU, X IPUCCH resources may be simultaneously allocated, which are used for feeding back different HARQ-ACK information. X is greater than or equal to 2. At this time, a first processing method is as follows. A UE only transmits corresponding HARQ-ACK information in one IPUCCH therein, that is, discards the remaining IPUCCH resources and HARQ-ACK information thereof. A second processing method is as follows. A UE only occupies one IPUCCH resource therein, so as to transmit all the HARQ-ACK information needing to be fed back, such as, a IPUCCH resource capable of supporting the greatest HARQ-ACK payload; alternatively, a IPUCCH capable of bearing all the foregoing HARQ-ACK information needing to be fed back, and the HARQ-ACK payload supported thereof is the minimum, so as to reduce overheads of uplink PUCCH resources.

Within one uplink TU, X sPUCCH resources may be simultaneously allocated, and are configured to feed back different HARQ-ACK information, in which X is greater than or equal to 2. At this time, a first processing method is as follows. A UE only transmits corresponding HARQ-ACK information in one sPUCCH therein, that is, discards the remaining sPUCCH resources and HARQ-ACK information thereof. A second processing method is as follows. A UE only occupies one sPUCCH resource therein, and transmits all the HARQ-ACK information needing to be fed back, e.g., a sPUCCH resource capable of supporting the maximum HARQ-ACK payload; alternatively, a sPUCCH capable of bearing all the HARQ-ACK information needing to be fed back, and the supported HARQ-ACK payload thereof is minimum, so as to reduce overheads of uplink PUCCH resources.

Corresponding to foregoing method, the present disclosure also provides a device, such as, a terminal (500) or a base station (600). The device may be configured to implement foregoing method.

Figure 5:
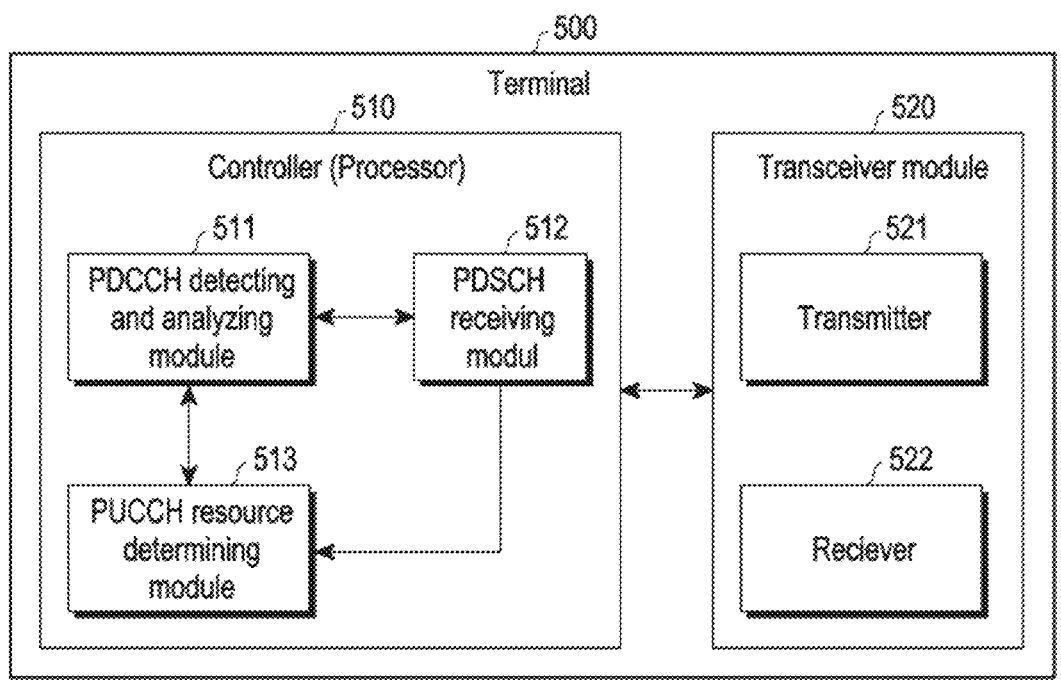
FIG. 5 is a schematic diagram illustrating a structure of a terminal, in accordance with an embodiment of the present disclosure.

As shown in FIG. 5, a terminal (500) includes a controller (510) and transceiver module (520).

The controller (510) can be or includes at least one processor (such as, central processing unit (CPU) or graphic processing unit (GPU)). The controller (510) may be configured to control the overall operations of the terminal (500). The controller (510) includes PDCCH detecting and analyzing module (511), a PDSCH receiving module (512), a PUCCH resource determining module (513).

The PDCCH detecting and analyzing module (511) is configured to detect PDCCH of a scheduled PDSCH in a configured control resource set, and analyzes the detected PDCCH.

The PDSCH receiving module (512) is configured to receive PDSCH, based on the detected PDCCH.

The PUCCH resource determining module (513) is configured to determine a PUCCH resource, which feeds back HARQ-ACK information. The transceiver module (520) includes transmitter (521) and receiver (522). The transceiver module (520) is configured to receive various types of downlink signals from a BS, and transmit the HARQ-ACK information using the determined PUCCH resources.

Figure 6:
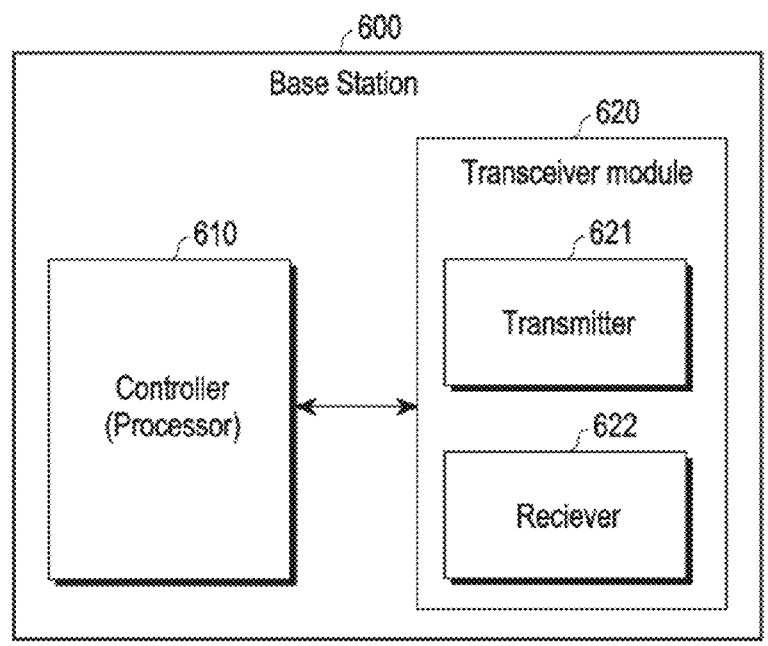
FIG. 6 is a schematic diagram illustrating a structure of a base station, in accordance with an embodiment of the present disclosure.

As shown in FIG. 6, a base station (500) includes a controller (610) and transceiver module (620).

The controller (610) can be or includes at least one processor (such as, CPU or GPU). The controller (610) may be configured to control the overall operations of the base station (600).

The transceiver module (620) includes transmitter (621) and receiver (622).

According to one embodiment of present disclosure, a method for allocating Physical Uplink Control Channel (PUCCH) resources, comprising: detecting, by a User Equipment (UE), a Physical Downlink Control Channel (PDCCH) scheduling a Physical Downlink Shared Channel (PDSCH) in a configured control resource set; analyzing, by the UE, the detected PDCCH, correspondingly receiving the PDSCH, and determining PUCCH resources feeding back Hybrid Automatic Repeat request-ACK (HARQ-ACK)

information; and, transmitting, by the UE, the HARQ-ACK information by using the determined PUCCH resources.

Wherein determining the PUCCH resources feeding back the HARQ-ACK information comprises: on the basis of a HARQ-ACK feedback delay indicated by the PDCCH, for one PUCCH, constituting a binding window by a set of downlink Time Units (TUs) and/or Mini Time Unit (MTUs), which are located by all the possible PDSCHs feeding back the HARQ-ACK information in the PUCCH; allocating the PUCCH resources feeding back the HARQ-ACK information for a Control Channel Element (CCE) of each downlink TU and/or MTU within the binding window, or, allocating the PUCCH resources feeding back the HARQ-ACK information for CCEs of some downlink TUs and/or MTUs within the binding window.

Wherein determining the PUCCH resources feeding back the HARQ-ACK information comprises: i) for a PDCCH, a HARQ-ACK feedback delay of the PDCCH is $k_i \le C$, allocating a short PUCCH (sPUCCH) for feeding back the HARQ-ACK information; otherwise, allocating a long PUCCH (lPUCCH) for feeding back the HARQ-ACK information, wherein C is a parameter for controlling a type of the allocated PUCCH; or, ii) for a PDCCH, the HARQ-ACK feedback delay of the PDCCH is $k_i \le C_1$, only allocating a sPUCCH for feeding back the HARQ-ACK; for a PDCCH, the HARQ-ACK feedback delay of the PDCCH is $C_1 < k_i \le C_2$, supporting to dynamically distinguish a sPUCCH and a lPUCCH for feeding back the HARQ-ACK; otherwise, only allocating a lPUCCH for feeding back the HARQ-ACK, wherein $C_1$ and $C_2$ are parameters for controlling a type of the allocated PUCCH, $C_1$ is less than or equal to $C_2$.

The method further comprising: corresponding to one or more minimum values of $k_i$, allocating implicit sPUCCH resources feeding back the HARQ-ACK information for the PDCCH, and for another $k_i$, in indicating lPUCCH resources for feeding back the HARQ-ACK information by ACK/NACK Resource Indicator (ARI), wherein the ARI is indicated by HARQ-ACK resources.

Wherein determining the PUCCH resources feeding back the HARQ-ACK information comprises: on the basis of a HARQ-ACK feedback delay, determining the allocated implicit PUCCH resources for feeding back the HARQ-ACK information, or adopting an ARI to indicate the PUCCH resources for feeding back the HARQ-ACK information; i) for a PDCCH, the HARQ-ACK feedback delay of the PDCCH is $k_i \le C$, allocating the implicit PUCCH resources for feeding back the HARQ-ACK information; otherwise, allocating the PUCCH resources for feeding back the HARQ-ACK information based on the ARI; or, ii) on the basis of 1-bit indication information of the PDCCH, determining the currently allocated implicit PUCCH resources for feeding back the HARQ-ACK information, or allocating the PUCCH resources for feeding back the HARQ-ACK information based on the ARI; or, iii) for a PDCCH, a Downlink Assignment Index (DAI) of the PDCCH is 1, allocating the implicit PUCCH resources for feeding back the HARQ-ACK information; otherwise, indicating the PUCCH resources for feeding back the HARQ-ACK information by using the ARI; or, iv) for the first PDSCH scheduled within the binding window, the DAI of the PDCCH of the first PDSCH is 1, allocating the implicit PUCCH resources for feeding back the HARQ-ACK information; otherwise, indicating the PUCCH resources for feeding back the HARQ-ACK information by using the ARI; or, v) in a case, where $k_i \le C$ and DAI=1, allocating the implicit PUCCH resources feeding back the HARQ-ACK information for the PDCCH; otherwise, allocating the PUCCH resources feeding back the HARQ-ACK information based on the ARI.

The method further comprising: performing a joint encoding on a HARQ-ACK feedback delay and an ARI, wherein an information field of the joint encoding is configured to indicate a time and position of the allocated PUCCH resources, and resources occupied within a time and position.

Wherein determining the PUCCH resources feeding back the HARQ-ACK information comprises: when simultaneously allocating sPUCCH resources and lPUCCH resources within one uplink TU, transmitting corresponding HARQ-ACK information by using an Orthogonal Frequency Division Multiplexing (OFDM) symbol according to the sPUCCH, wherein lPUCCH and sPUCCH are conflicting with each other on the OFDM symbol, and, i) transmitting the corresponding HARQ-ACK information by using the remaining OFDM symbols, according to the lPUCCH; or, ii) transmitting, by the UE, the corresponding HARQ-ACK information in one PUCCH therein, and discarding the remaining HARQ-ACK information.

Wherein determining the PUCCH resources feeding back the HARQ-ACK information comprises: when simultaneously allocating multiple lPUCCH resources within one uplink TU, transmitting, by the UE, the corresponding HARQ-ACK information in one lPUCCH, and discarding the remaining HARQ-ACK information; or, feeding back, by the UE, all the HARQ-ACK information needing to be fed back in one lPUCCH.

Wherein determining the PUCCH resources feeding back the HARQ-ACK information comprises: when simultaneously allocating multiple sPUCCH resources within one uplink TU, transmitting, by the UE, the corresponding HARQ-ACK information in one sPUCCH, and discarding the remaining HARQ-ACK information; or, feeding back, by the UE, all the HARQ-ACK information needing to be fed back in one sPUCCH.

According to one embodiment of present disclosure, a device for allocating Physical Uplink Control Channel (PUCCH) resources, comprising: a Physical Downlink Control Channel (PDCCH) detecting and analyzing module, a Physical Downlink Shared Channel (PDSCH) receiving module, a PUCCH resource determining module and a transceiver module, wherein the PDCCH detecting and analyzing module is configured to detect a PDCCH scheduling a PDSCH in a configured control resource set, and analyze the detected PDCCH; the PDSCH receiving module is configured to receive the PDSCH based on the detected PDCCH; the PUCCH resource determining module is configured to determine PUCCH resources for feeding back Hybrid Automatic Repeat request-ACK (HARQ-ACK) information; and, the transceiver module is configured to receive a downlink signal from a Base Station (BS), and transmit the HARQ-ACK information by using the determined PUCCH resources.

Persons having ordinary skill in the art may understand that, all the blocks or some blocks of methods in foregoing embodiments may be completed by hardware, which is instructed by a program. The program may be stored in a computer readable storage medium. When the program is executed, one block of the method embodiment or a combination thereof is included.

In addition, each functional unit in each embodiment of the present disclosure may be integrated into one processing module, or each unit may be an independent physical entity. Still alternatively, two or more units may be integrated into one module. Foregoing integrated module may be implemented in the form of hardware, or in the form of software functional modules. When being implemented in the form of software functional modules, and is sold or used as an independent product, the integrated module may also be stored in a computer readable storage medium.

The foregoing is only preferred embodiments of the present disclosure, which is not for use in limiting the present disclosure. Any modifications, equivalent substitutions and improvements made within the spirit and principle of the present disclosure, should be covered by the present disclosure.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a user equipment (UE) in a communication system, the method comprising:
   receiving, from a base station, downlink control information including an indicator for a slot timing value;
   identifying, based on the slot timing value, a set of candidate physical downlink shared channel (PDSCH) receptions for which hybrid automatic repeat and request (HARQ)-acknowledgment (ACK) information is to be transmitted in a slot, wherein the slot timing value is in a descending order in a set of slot timing values, an index of the set of candidate PDSCH receptions is associated with the slot timing value, and the slot timing value in the set of slot timing values is within a range of 0~15 time units; and
   transmitting, to the base station, the HARQ-ACK information for the identified set of candidate PDSCH receptions in the slot.

2. The method of claim 1, wherein the HARQ-ACK information for the set of candidate PDSCH receptions is transmitted in a physical uplink control channel (PUCCH) in the slot corresponding to the slot timing value indicated by the indicator.

3. The method of claim 2, wherein time and frequency resource information of the PUCCH is identified based on resource indicator information in the downlink control information.

4. The method of claim 2, wherein information on PUCCH resources is provided by a higher layer, and wherein one of the PUCCH resources for HARQ-ACK transmission is determined based on resource indicator information in the downlink control information.

5. A user equipment (UE) in a communication system, comprising:
   a transceiver; and
   a processor operably coupled to the transceiver, the processor configured to:
      receive, from a base station via the transceiver, downlink control information including an indicator for a slot timing value,
      identify, based on the slot timing value, a set of candidate physical downlink shared channel (PDSCH) receptions for which hybrid automatic repeat and request (HARQ)-acknowledgment (ACK) information is to be transmitted in a slot, wherein the slot timing value is in a descending order in a set of slot timing values, an index of the set of candidate PDSCH receptions is associated with the slot timing value, and the slot timing value in the set of slot timing values is within a range of 0~15 time units, and
      control the transceiver to transmit, to the base station, the HARQ-ACK information for the identified set of candidate PDSCH receptions in the slot.

6. The UE of claim 5, wherein the HARQ-ACK information for the set of candidate PDSCH receptions is transmitted in a physical uplink control channel (PUCCH) in the slot corresponding to the slot timing value indicated by the indicator.

7. The UE of claim 6, wherein time and frequency resource information of the PUCCH is identified based on resource indicator information in the downlink control information.

8. The UE of claim 6, wherein information on PUCCH resources is provided by a higher layer, and wherein one of the PUCCH resources for HARQ-ACK transmission is determined based on resource indicator information in the downlink control information.

9. A method performed by a base station for allocating a resource in a communication system, the method comprising:
   transmitting, to a user equipment (UE), downlink control information including an indicator for a slot timing value; and
   receiving, from the UE, hybrid automatic repeat and request (HARQ)-acknowledgement (ACK) information for a set of candidate physical downlink shared channel (PDSCH) receptions in a slot corresponding to the slot timing value indicated by the indicator,
   wherein the set of candidate PDSCH receptions, for which the HARQ-ACK information is to be transmitted in the slot, is identified based on the slot timing value in a set of slot timing values,
   wherein the slot timing value is in a descending order in the set of slot timing values, and an index of the set of candidate PDSCH receptions is associated with the slot timing value, and
   wherein the slot timing value in the set of slot timing values is within a range of 0~15 time units.

10. The method of claim 9, wherein the HARQ-ACK information for the set of PDSCH receptions is received in a physical uplink control channel (PUCCH) in the slot corresponding to the slot timing value indicated by the indicator.

11. The method of claim 10, wherein time and frequency resource information of the PUCCH is based on resource indicator information in the downlink control information.

12. The method of claim 10, wherein information on PUCCH resources is provided by a higher layer, and wherein one of the PUCCH resources for HARQ-ACK transmission is based on resource indicator information in the downlink control information.

13. A base station for allocating a resource in a communication system, comprising:
   a transceiver; and
   a processor operably coupled to the transceiver, the processor configured to:
      transmit, to a user equipment (UE), downlink control information including an indicator for a slot timing value, and
      receive, from the UE, hybrid automatic repeat and request (HARQ)-acknowledgement (ACK) information for a set of candidate physical downlink shared channel (PDSCH) receptions in a slot corresponding to the slot timing value indicated by the indicator,
   wherein the set of candidate PDSCH receptions, for which the HARQ-ACK information is to be transmitted in the slot, is identified based on the slot timing value in a set of slot timing values,
   wherein the slot timing value is in a descending order in the set of slot timing values, and an index of the set of candidate PDSCH receptions is associated with the slot timing value, and
   wherein the slot timing value in the set of slot timing values is within a range of 0~15 time units.

14. The base station of claim 13, wherein the HARQ-ACK information for the set of PDSCH receptions is received in a physical uplink control channel (PUCCH) in the slot corresponding to the slot timing value indicated by the indicator.

15. The base station of claim 14, wherein time and frequency resource information of the PUCCH is based on resource indicator information in the downlink control information.

16. The base station of claim 14, wherein information on PUCCH resources is provided by a higher layer, and wherein one of the PUCCH resources for HARQ-ACK transmission is based on resource indicator information in the downlink control information.

* * * * *